United States Patent
Gao et al.

(10) Patent No.: US 11,243,320 B2
(45) Date of Patent: Feb. 8, 2022

(54) METHOD OF STRIPPING STRONG REFLECTION LAYER BASED ON DEEP LEARNING

(71) Applicant: Xi'an Jiaotong University, Shaanxi (CN)

(72) Inventors: Jinghuai Gao, Shaanxi (CN); Yajun Tian, Shaanxi (CN); Daoyu Chen, Shaanxi (CN); Naihao Liu, Shaanxi (CN)

(73) Assignee: Xi'an Jiaotong University, Xi'an (CN)

( * ) Notice: Subject to any disclaimer, the term of this patent is extended or adjusted under 35 U.S.C. 154(b) by 0 days.

(21) Appl. No.: 17/243,546

(22) Filed: Apr. 28, 2021

(65) Prior Publication Data

US 2021/0349227 A1    Nov. 11, 2021

(51) Int. Cl.
  *G01V 1/30*    (2006.01)
  *G01V 1/36*    (2006.01)
  *G06N 3/08*    (2006.01)

(52) U.S. Cl.
  CPC .............. *G01V 1/307* (2013.01); *G01V 1/36* (2013.01); *G06N 3/08* (2013.01); *G01V 2210/50* (2013.01); *G01V 2210/63* (2013.01)

(58) Field of Classification Search
  CPC ...... G01V 1/307; G01V 1/36; G01V 2210/63; G01V 2210/50; G06N 3/08
  See application file for complete search history.

(56) References Cited

U.S. PATENT DOCUMENTS

| | | | | |
|---|---|---|---|---|
| 8,972,531 B2 * | 3/2015 | Sembroski | ............... | G01V 1/22 709/219 |
| 9,207,355 B2 * | 12/2015 | DiFoggio | ............... | G01V 99/00 |
| 9,791,581 B2 * | 10/2017 | Siliqi | ............... | G01V 1/362 |
| 9,952,340 B2 * | 4/2018 | Bas | ............... | G01V 1/301 |
| 10,895,653 B2 * | 1/2021 | Lee | ............... | G01V 1/36 |

(Continued)

FOREIGN PATENT DOCUMENTS

| | | |
|---|---|---|
| CN | 102650702 A | 8/2012 |
| CN | 106249299 A | 12/2016 |
| CN | 106707338 A | 5/2017 |

(Continued)

OTHER PUBLICATIONS

Liu et al. ,3D Seismic Facies Classification using Convolutional Neural Network and Semi-supervised Generative Adversarial Network, SEG (Year: 2019).*

(Continued)

*Primary Examiner* — Mohammad K Islam

(57) ABSTRACT

Disclosed herein is a method of stripping a strong reflection layer based on deep learning. The method establishes a direct mapping relationship between a strong reflection signal and seismic data of a target work area through a nonlinear mapping function of the deep neural network, and strips a strong reflection layer after the strong layer is accurately predicted. A mapping relationship between the seismic data containing the strong reflection layer and an event of the strong reflection layer is directedly found through training parameters. In addition, this method does not require an empirical parameter adjustment, and only needs to prepare a training sample that meets the actual conditions of the target work area according to the described rules.

3 Claims, 5 Drawing Sheets

(56) References Cited

U.S. PATENT DOCUMENTS

2019/0302293 A1 10/2019 Zhang et al.
2020/0064507 A1 2/2020 Mao et al.

FOREIGN PATENT DOCUMENTS

CN 107340536 A 11/2017
CN 110414675 A 11/2019

OTHER PUBLICATIONS

Wang et al., 3D seismic waveform of channels extraction by artificial intelligence, SEG (Year: 2019).*
Wang et al., End-to-End Deep Neural Network for Seismic Inversion, SEG (Year: 2019).*
FaultSeg3D: Using synthetic data sets to train an end-to-end convolutional neural network for 3D seismic fault segmentation; Xinming Wu et al. Geophysics, vol. 84, No. 3 (May-Jun. 2019); p. IM35-IM45.
The application of T2 strong reflextor influence removal technology bases based on pursuit matic; Peng an et al. Geophysical and Geochemical Exploration; 2016, vol. 40, No. 5.
Case Analysis of Seismic Processing Technology Based on Automation and Intelligence; Hong, Chengyu et al., 2019 Geophysical Exploration Technology Seminar of China Petroleum Society.
Daoyu Chen et al ..High resolution inversion of seismic wavelet and reflectivity using iterative deep neural networks . «2019 SEG International Exposition and 89th Annual Meeting. 2019.
Optimizing the method of variational modal decomposition to eliminate the influence of strong reflections; Geophysical prospecting for petroleum; vol. 55, No. 11.
Fine Processing and Analysis of the Weak Reflected Wave of the ThinCoal Seam Shielded by Strong Reflecting Layer; Haizhong Liu et al. Geophysical exploration of coal mines in China; p. 185-188.

* cited by examiner

METHOD OF STRIPPING STRONG REFLECTION LAYER BASED ON DEEP LEARNING

CROSS-REFERENCE TO RELATED APPLICATIONS

This application claims the benefit of priority from Chinese Patent Application No. 202010350983.7, filed on Apr. 28, 2020. The content of the aforementioned application, including any intervening amendments thereto, is incorporated herein by reference in its entirety.

TECHNICAL FIELD

This application relates to geophysical exploration for petroleum, and more particularly to a method of stripping a strong reflection layer based on deep learning to detect a weak reflection signal of an oil and gas reservoir.

BACKGROUND

A strong reflection layer may be encountered in the reservoir prediction. The strong reflection layer is formed due to large difference in formation wave impedance, and may exist above or below the reservoir. Generally, the strong reflection layer occurs at coal stratum, mudstone caprock formed by stable deep-water deposition and unconformity surfaces of the weathered layer. The strong reflection layer has strong energy, and the effective information nearby will be submerged in the strong reflection, such that the prediction of the reservoir fluid in the strong reflection area cannot be carried out. Therefore, how to eliminate the influence of the strong reflection layer is an urgent obstacle to be overcome in the reservoir prediction.

So far, to strip the strong reflection, researchers have proposed many solutions such as spectral decomposition, matching pursuit and multiwavelet decomposition (She Gang et al., 2013, Prediction of Sand Reservoir with Multi-Wavelet Seismic Trace Decomposition and Reconstruction. Journal of Southwest Petroleum University: Science & Technology Edition (in Chinese), 35(1):19-27. Zhang Ming et al., 2013, Waveform classification and seismic recognition by convolution neural network. Chinese J. Geophys. (in Chinese), 62(1): 374-382. Chen Renjie et al., 2014, Reservoir prediction technology based on wavelet decomposition and reconsiruction. Marine Geology Frontiers (in Chinese), 30(1): 55-61. Wang Zhenqing et al., 2014, Frequency division inversion for the intraplatform shoal reservoir. Natural Gas Geoscience (in Chinese), 25(11): 1847-1854. Liu Peijin, 2014, Research of Beach Bar Sand Concentrated Segment Reservoir Description Technical, China University of Petroleum Degree Thesis of Engineering Master. Wang Yanghua et al., 2010, Multichannel matching pursuit for seismic trace decomposition. Geophysics, 75(4): V61-V66.). With regard to the spectral decomposition and the matching pursuit, the data of strong reflection in the coal seam is estimated based on the low-frequency characteristics of the strong reflection in the coal seam for the reduction of the strong reflection energy (Li Suhua et al., 2013, Reservoir prediction in the top Leikoupo unconformity surface in the area XC, Sichuan, Oil Geophysical Prospecting (in Chinese), 48(5), 793-798. Li Haishan et al., 2014, Coal seam strong reflection separation with matching pursuit. Oil Geophysical Prospecting (in Chinese), 49(5): 866-870.). However, the matching pursuit algorithm has strong sparsity, and thus the strong reflection record obtained based on matching pursuit has poor lateral continuity, reducing the lateral accuracy of reservoir prediction. The spectral decomposition decomposes the seismic data into a series of frequency data. There is no quantitative standard for the frequency selection of the data suitable for the reservoir prediction. In order to obtain a higher vertical resolution, it is likely to select the data with a too high frequency band, causing a pitfall in the reservoir prediction. In addition, the frequency band of the data after frequency division is narrow, and there is a lack of frequency components in the subsequent inversion result, resulting in a large difference between the inversion result and the actual situation. In the multi-wavelet decomposition, the post-stack data is first decomposed, and the seismic wave of a target layer in the seismic trace is decomposed into Ricker wavelets with different dominant frequencies and energy. Then the Ricker wavelets with a dominant frequency corresponding to the strong reflection signal are removed from the original seismic trace, and the remaining Ricker wavelets are reconstructed to obtain a seismic trace with the strong reflection stripped (Zhao Shuang et al., 2007, Using multiple wavelet decomposition technique to detect the sandstone reservoir with coal layer. Natural Gas Industry (in Chinese), 27(9): 44-47.). However, the traditional seismic trace model based on the assumption of a single fixed wavelet struggles with some limitations, and thus fails to effectively eliminate the strong reflection signals from the coal seam.

SUMMARY

In order to overcome the above-mentioned shortcomings of the prior art, an objective of the present disclosure is to provide a method for stripping a strong reflection layer based on deep learning. The method includes wavelet prediction and strong reflection layer prediction. Deep neural network modeling is used to establish a mapping relationship between a seismic wavelet and seismic data and a mapping relationship between the strong reflection layer and seismic data, so as to better remove the strong reflection signal.

The technical solutions of the present disclosure are described as follows.

A method of stripping a strong reflection layer based on deep learning, comprising:

(1) making a training sample for seismic wavelet prediction;

(2) training a mapping relationship between a seismic wavelet and a seismic record based on an alternate iterative deep neural network;

(3) predicting a seismic wavelet w based on the mapping relationship between the seismic wavelet and the seismic record trained in step (2);

(4) selecting seismic data below or above a strong reflection interface in a target work area, wherein the seismic data does not contain the strong reflection interface; and normalizing the seismic data trace by trace as a training sample of a weak reflection record $S_n$ for stripping the strong reflection layer;

(5) counting a range K1-K2 of a ratio of a peak amplitude of the strong reflection layer in the target work area to a peak amplitude of a reflected wave except the strong reflection layer;

(6) based on the seismic wavelet w predicted in step 3, building a strong reflection record $S_s$ only containing the strong reflection layer using a convolution algorithm; wherein a range of a reflection coefficient used in the convolution algorithm is set to the range K1-K2 obtained in step (5); and a position of a reflection interface changes randomly;

(7) randomly choosing the strong reflection record $S_s$ and the weak reflection record $S_n$ followed by adding to obtain a seismic record $S_r$ containing strong reflection and weak reflection simultaneously;

(8) weighting the $S_r$, $S_s$, and $S_n$ with the strong reflection layer as a center using Gaussian window Gw followed by normalization to obtain $GS_r$, $GS_s$ and $GS_n$;

(9) training a mapping relationship between the $GS_r$ and the $GS_s$ based on U-Net;

(10) selecting seismic record $S_o$ containing the strong reflection layer in the target work area; recording a maximum value $M_s$ of data of each trace; and taking a position $t_p$ of the maximum value $M_s$ of the data of each trace as a position of the strong reflection layer;

(11) weighting the seismic record $S_o$ with the position $t_p$ as a center using the Gaussian window Gw to obtain a weighted seismic record; and normalizing seismic data of each trace by dividing by the maximum value $M_s$ to obtain seismic data of each trace $GS_o$;

(12) predicting a strong reflection layer $GD_{si}$ of the seismic data of each trace $GS_{oi}$ based on the mapping relationship obtained in step (9);

(13) subjecting the $GD_{si}$ to amplitude recovery according to a formula shown as follows:

$$D_{si}(t) = \begin{cases} 0 & G_w(t) \leq 0.1 \\ GD_{si}(t) * M_{si}/G_w(t) & G_w(t) \geq 0.1 \end{cases} \quad (1)$$

wherein a subscript i is a trace number; and $D_{si}$ is a strong reflection layer after the amplitude recovery; and

(14) obtaining seismic data $D_{ni}$ after the strong reflection layer is stripped using a formula shown as follows:

$$D_{ni}(t) = S_{oi}(t) - D_{si}(t) \quad (2).$$

In some embodiments, in step (6), the record $S_s$ only containing the strong reflection layer is built using a convolution model; the seismic wavelet w is obtained in step (3); the position of the reflection coefficient corresponding to the reflection interface changes randomly; and the range of the reflection coefficient is a random value within the range K1-K2 obtained in step (5).

In some embodiments, the Gaussian window Gw used in step (8) is expressed as follows:

$$G_w(t) = e^{-a(t-t_0)^2}. \quad (3)$$

In some embodiments, an optimization function used in step (9) is shown as follows:

$$\min_{C_\Theta^\dagger} E_{learn} = \quad (4)$$

$$\min_{C_\Theta^\dagger} E[|GS_{si}(t) - C_\Theta^\dagger GS_{ri}(t)| + |GS_{ri}(t) - C_\Theta^\dagger GS_{ri}(t) - GS_{ni}(t)|];$$

wherein a subscript i is a trace number; $GS_{si}$ is a seismic record only containing strong reflection in the training sample; $GS_{ri}$ is a seismic record containing the strong reflection; $C_\Theta^*$ is a mapping function determined by a parameter set $\Theta$, and represents a mapping relationship between the seismic record containing the strong reflection and the seismic record only containing the strong reflection; and $GS_{ni}$ is a seismic record without the strong reflection.

Compared to the prior art, the beneficial effects of the present disclosure are described as follows.

The method provided herein first establishes a direct mapping relationship between wavelets and seismic data of a target work area through a nonlinear mapping function of the deep neural network to directly extract the accurate seismic wavelet from the seismic data. Then, the extracted seismic wavelet and the actual data free of the strong reflection layer in the same work area are used as samples to train a mapping relationship between the seismic trace containing the strong reflection layer and the seismic trace only containing the strong reflection layer. A mapping relationship between the seismic data containing the strong reflection layer and an event of the strong reflection is directedly found in the prediction process of the strong reflection layer. In addition, this method does not require an empirical parameter adjustment, and only needs to prepare a training sample that meets the actual conditions of the target work area according to the rules described above, allowing for simple operation. Only one set of parameters is required for the same work area. After the model parameters are trained, the calculation speed is fast, which is suitable for processing of massive seismic data. The method provided herein can accurately match the strong reflection layer, and the stripping of the strong reflection layer is less likely to damage the effective weak reflection information of sand shale, which is suitable for the reservoir prediction, and provides a basis for reservoir prediction and oil-gas exploration.

BRIEF DESCRIPTION OF THE DRAWINGS

FIG. 4A: a seismic section with a strong reflection layer in accordance with an embodiment of the present disclosure; FIG. 4B: a seismic section with the strong reflection layer removed in accordance with an embodiment of the present disclosure; FIG. 4C: a seismic section only containing the strong reflection layer in accordance with an embodiment of the present disclosure; FIG. 5A: a horizontal slice of a single-frequency (5 Hz) three-dimensional seismic data containing a strong reflection layer in accordance with an embodiment of the present disclosure; FIG. 5B: a horizontal slice of a single-frequency (80 Hz) three-dimensional seismic data containing a strong reflection layer in accordance with an embodiment of the present disclosure; FIG. 5C: a horizontal slice of the single-frequency (5 Hz) three-dimensional seismic data after the strong reflection layer is removed in accordance with an embodiment of the present disclosure; and FIG. 5D: a horizontal slice of a single-frequency (80 Hz) three-dimensional seismic data after the strong reflection layer is removed in accordance with an embodiment of the present disclosure.

DETAILED DESCRIPTION OF EMBODIMENTS

The technical solutions of this disclosure will be described below clearly and completely with reference to the embodiments and the accompanying drawings. Obviously, presented herein is a part of embodiments of this disclosure, and other embodiments made by those skilled in the art based on the content disclosed herein without sparing any creative effort should fall within the scope of the present disclosure defined by the appended claims.

It should be noted that the terms "first" and "second" used herein are used to distinguish similar objects, and not intended to describe a specific sequence. It should be understood that the data used in this way can be interchanged under appropriate circumstances so that the embodiments described herein can be implemented in a sequence other than those illustrated or described herein. In addition, the terms "including" and "comprising" and any variations thereof should be understood as a non-exclusive inclusion. For example, a process, method, system, product or device that includes a series of steps or units are not limited to those clearly listed. Those steps or units may include other steps or units that are not clearly listed or are inherent to the process, method, product or device.

The present disclosure will be further described with reference to the accompany drawings.

1. Stripping of a Strong Reflection Layer Based on Deep Learning

Figure 1:
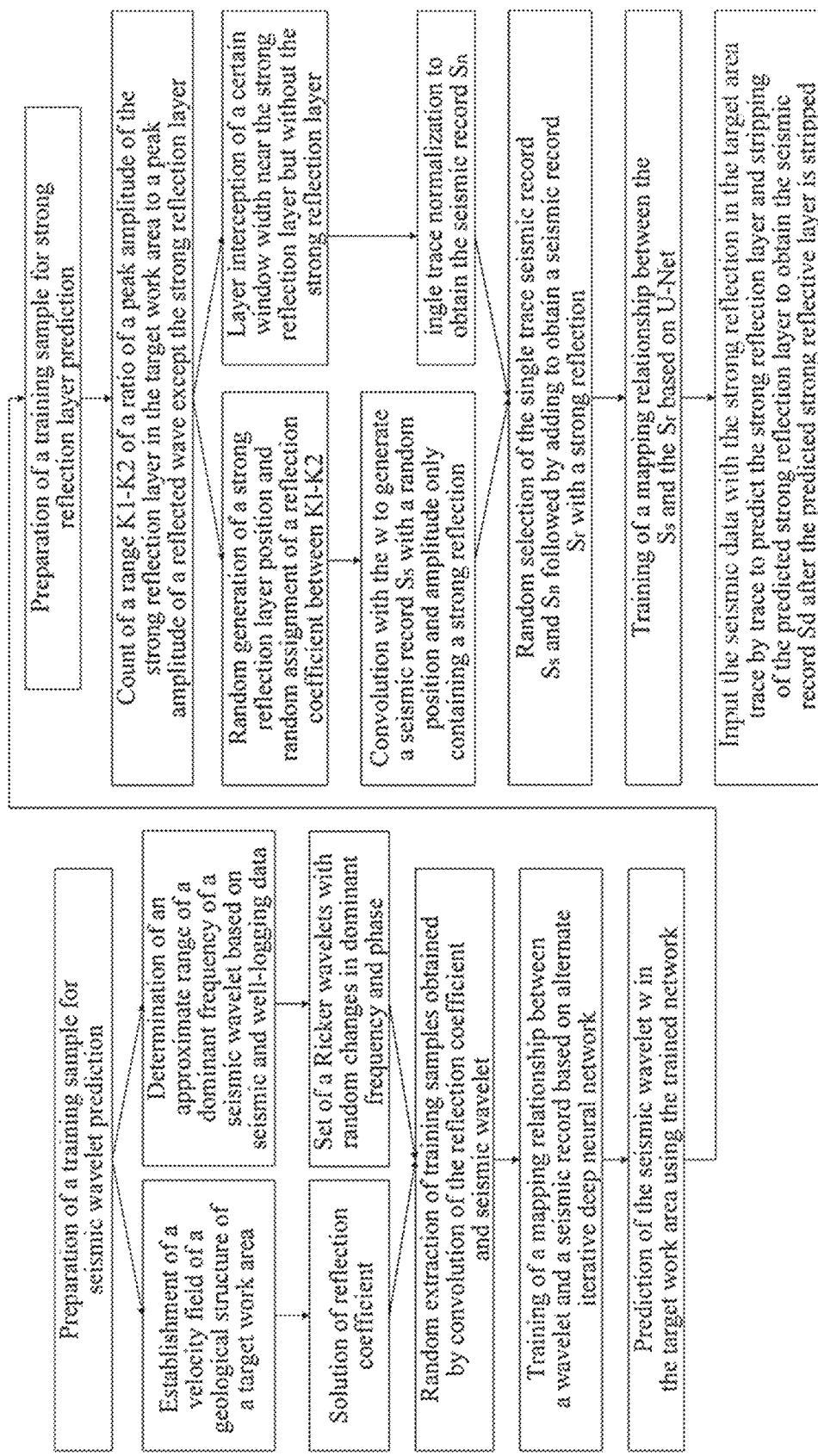
FIG. 1 is a flow chart of a method of stripping a strong reflection layer based on deep learning in accordance with an embodiment of the present disclosure.

A main process of the method provided herein is shown in FIG. 1, which is specifically described as follows.

(1) Preparation of a Training Sample for Seismic Wavelet Prediction (a) Seismic Wavelet Ricker wavelet whose phase and dominant frequency change randomly. It is assumed that the dominant frequency of seismic data in a target work area is $f_0$, a change interval of the dominant frequency of the Ricker wavelet is $(1-0.3)*f_0-(1+0.3)*f_0$. A phase change interval is $-90°-90°$.

(b) Reflection Coefficient

A velocity model and well-logging data acquired from the target survey are used to generate the reflection coefficient similar to a geological structure of the target work area.

Figure 2:
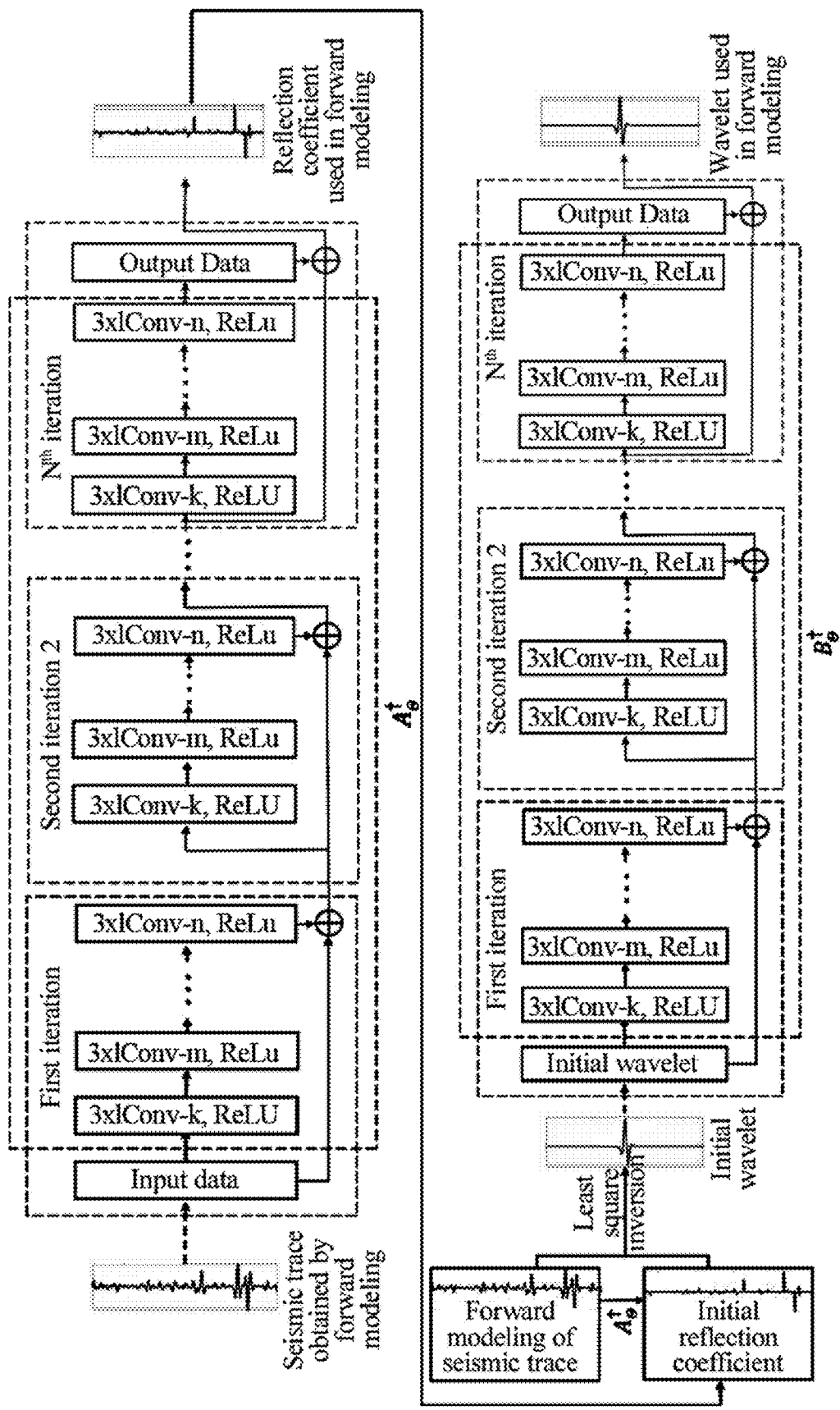
FIG. 2 schematically depicts a deep network used in training of a mapping relationship between a seismic wavelet and a seismic record in accordance with an embodiment of the present disclosure.

(2) Training of a Mapping Relationship Between the Seismic Wavelet and a Seismic Record Based on an Alternate Iterative Deep Neural Network The alternate iterative deep neural network is shown in FIG. 2.

(a) Training of a mapping relationship between the seismic record and the reflection coefficient, in which an optimization function is shown as follows:

$$\min_{A_\Theta^\dagger} E_{learn}^{initial\_r} = \min_{A_\Theta^\dagger} E\left[\left\|r(t) - A_\Theta^\dagger s(t)\right\|_2^2 + \lambda_1 \|\hat{r}_1(t)\|_1\right]. \quad (5)$$

(b) Training of a mapping relationship between a least square solution of the seismic wavelet under a constraint of a least square model and a real seismic wavelet:

$$\min_{B_\Theta^\dagger} E_{learn}^{w} = \min_{B_\Theta^\dagger} E\left[\left\|w(t) - B_\Theta^\dagger Q^\dagger s(t)\right\|_2^2 + \lambda_2 \|\hat{w}_1(t)\|_1\right] \quad (6)$$

in which s(t) is a seismic record in the training sample. $A_\Theta^\dagger$ and $B_\Theta^\dagger$ are mapping functions determined by the parameter set $\Theta$, and require independent training in different networks. The $A_\Theta^\dagger$ and $B_\Theta^\dagger$ have no influence on each other. r(t) and w(t) are the reflection coefficients of the training sample and the seismic wavelet, respectively. $Q^\dagger s(t)$ is equivalent to the least square solution of the seismic wavelet with known seismic record and reflection coefficient. $\hat{r}_1(t)=A_\Theta^\dagger s(t)$ is a reflection coefficient estimated by a first iterative network. $\hat{w}_1(t)=B_\Theta^\dagger Q^\dagger s(t)$ is a seismic wavelet estimated by a second iterative network. $\lambda_1$ and $\lambda_2$ are non-negative regularization parameters.

(3) Preparation of a Training Sample for Prediction of Strong Reflection Layer (a) Wavelet The seismic record s(t) is input into the mapping functions $A_\Theta^\dagger$ and $B_\Theta^\dagger$ to estimate a seismic wavelet w.

(b) Reflection Layer $S_{si}$ Representing a Strong Reflection Interface

A time range of the strong reflection layer in the target work area is counted. The time range is extended by 4 times a wavelength as a time window range W, in which the strong reflection coefficient $r_i$ appears. A position of the strong reflection coefficient changes randomly within the time window W. Magnitude of the strong reflection coefficient is a range K1-K2 of a peak amplitude of the strong reflection layer in the target work area to a peak amplitude of a reflected wave except the strong reflection layer. The strong reflection wave is obtained according to a convolution equation shown as follows:

$$S_{si}(t)=r_i(t)*w(t) \quad (7)$$

in which * is convolution. i is a trace number, $i\in[1,N]$.

(c) Record $S_{ni}$ without the Strong Reflection Layer

Seismic data below or above a strong reflection interface in a target work area that does not contain the strong reflection interface is selected. An intercepted time window range is the W in step (b). The seismic data is normalized trace by trace.

(d) Seismic Record $S_{ri}$ with a Strong Reflection Layer

The $S_{ni}$ and $S_{si}$ are randomly extracted and added to obtain the $S_{ri}$.

(e) A Gaussian window with a time-domain window width of three wavelet lengths is used to weight the $S_{ni}$, the $S_{si}$ and the $S_{ri}$ respectively to obtain $GS_{ni}$, $GS_{si}$ and $GS_{ri}$ with a corresponding time $t_0$ of the strong reflection layer as a center.

The Gaussian window is shown as follows:

$$G_w(t) = e^{-a(t-t_0)^2}. \quad (3)$$

Figure 3:
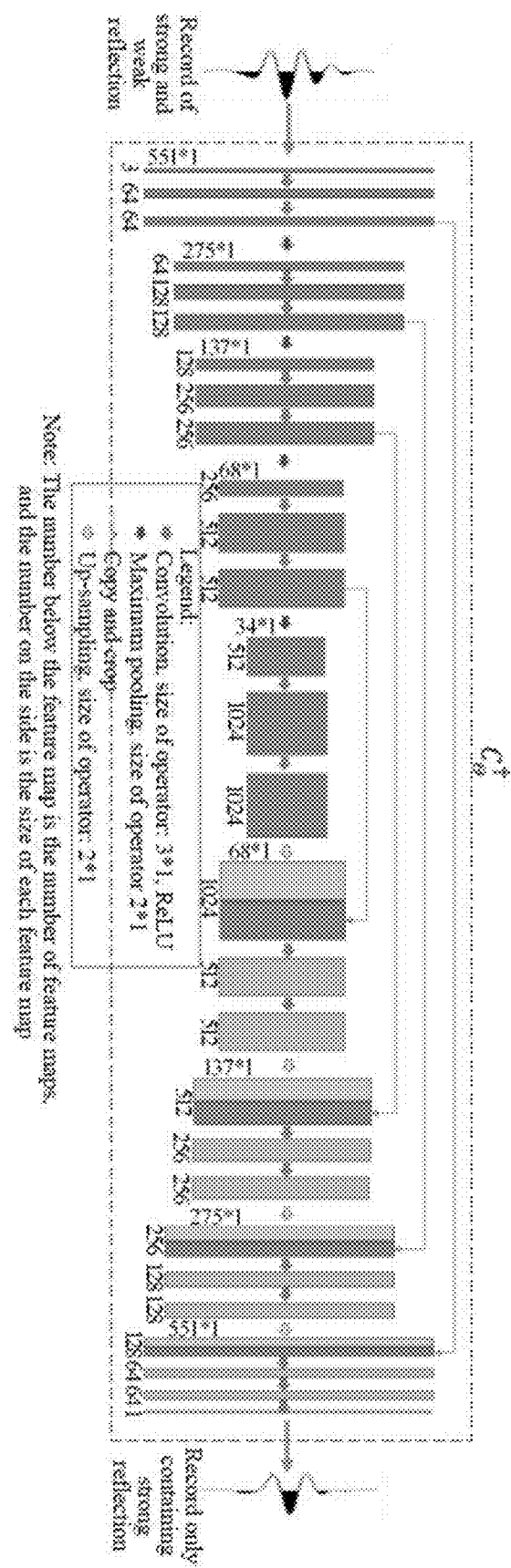
FIG. 3 schematically depicts a U-Net deep network used in training of a mapping relationship between a seismic record with the strong reflection layer and a strong reflection record in accordance with an embodiment of the present disclosure.

(4) Training of a Mapping Relationship Between the $GS_{ri}$ and the $GS_{si}$ Based on U-Net A structure of the net is shown in FIG. 3. An optimization function used herein is shown as follows:

$$\min_{C_\Theta^\dagger} E_{learn} = \quad (4)$$

$$\min_{C_\Theta^\dagger} E\left[\left|GS_{si}(t) - C_\Theta^\dagger GS_{ri}(t)\right| + \left|GS_{ri}(t) - C_\Theta^\dagger GS_{ri}(t) - GS_{ni}(t)\right|\right];$$

wherein a subscript i is a trace number; $GS_{si}$ is a seismic record only containing strong reflection in the training sample; $GS_{ri}$ is a seismic record containing the strong reflection $C_\Theta^\dagger$ is a mapping function determined by a parameter set $\Theta$, representing a mapping relationship between the seismic record containing the strong reflection and the seismic record only containing the strong reflection; and $GS_{ni}$ is a seismic record without the strong reflection.

(5) Data $S_o$ containing the strong reflection layer in the target work area is selected. A maximum value $M_{si}$ of each trace $S_{oi}$ is recorded, and a time position $t_p$ of the maximum value $M_s$ of each trace $S_{oi}$ is taken as the position of the strong reflection layer. Each seismic trace $S_{oi}$ is normalized by dividing by the maximum value $M_s$.

(6) A weighting is performed with the position $t_p$ as a center using the same Gaussian window as that in step (3) to obtain a weighted seismic record $GS_o$.

(7) The strong reflection layer $GD_{si}$ is predicted by inputting the actual seismic data $GS_{oi}$ of the target work area trace by trace using the mapping relationship trained in step (4):

$$GD_{si}(t) = C_\Theta^\dagger GS_{oi}(t) \quad (8).$$

(8) The strong reflection record of each trace is subjected to amplitude recovery according to a formula shown as follows:

$$D_{si}(t) = \begin{cases} 0 & G_w(t) \le 0.1 \\ GD_{si}(t) * M_{si}/G_w(t) & G_w(t) \ge 0.1 \end{cases}; \quad (1)$$

in which a subscript i is a trace number. $D_{si}$ is the strong reflection layer after the amplitude is restored; and

(14) Seismic data $D_{ni}$ after the strong reflection layer is stripped is obtained using a formula shown as follows:

$$D_{ni}(t) = S_{oi}(t) - D_{si}(t) \quad (2).$$

2. Actual Seismic Data

Figure 4A:
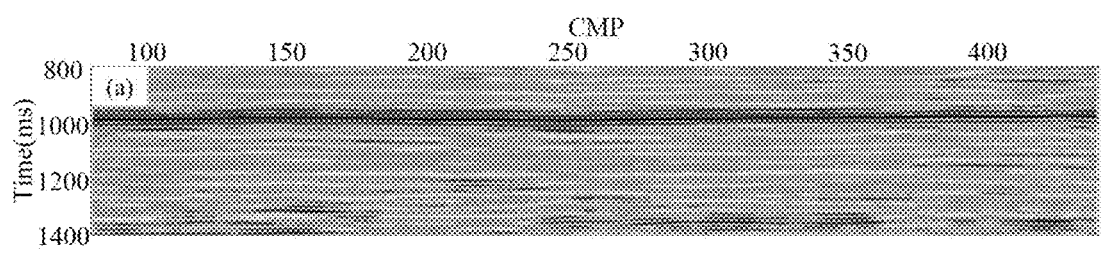
FIGS. 4A-4C schematically depict different seismic sections; where
Figure 4B:
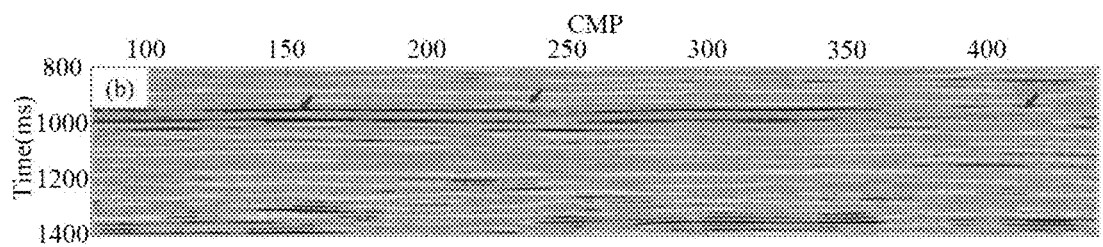
Figure 4C:
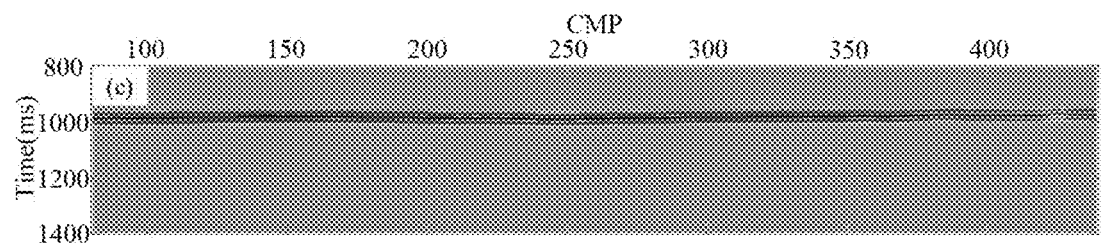

The method provided herein is applied to three-dimensional post-stack migration seismic data of a work area in the Ordos Basin. The data in this work area is affected by a strong reflection layer below the reservoir. FIG. 4A shows a typical two-dimensional cross section of the work area. It can be seen that the weak reflection signal of the strong reflection layer cannot be identified on the two-dimensional cross section. FIG. 4B is a seismic section after the strong reflection layer is stripped. It can be seen that after stripping, the sandstone reflection interface near the strong reflection layer is prominent, which is easy for reservoir prediction. The lateral energy change of the stripped strong shielding layer is consistent with the original strong reflection, and no stripping artifacts are generated (FIG. 4C). The stripping position is limited to a vicinity of the shielding layer, and the position information far away from the shielding layer is not affected.

Figure 5A:
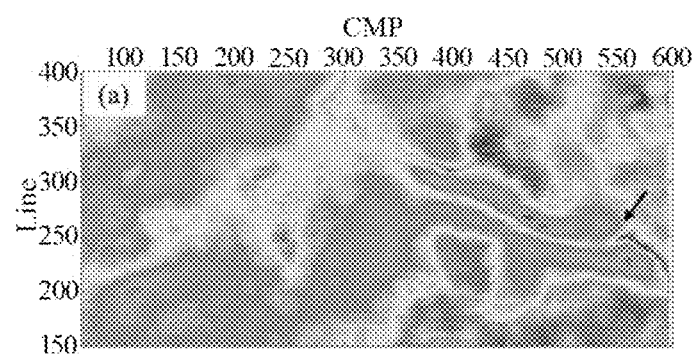
FIGS. 5A-5D show horizontal slices of a three-dimensional seismic data; where
Figure 5B:
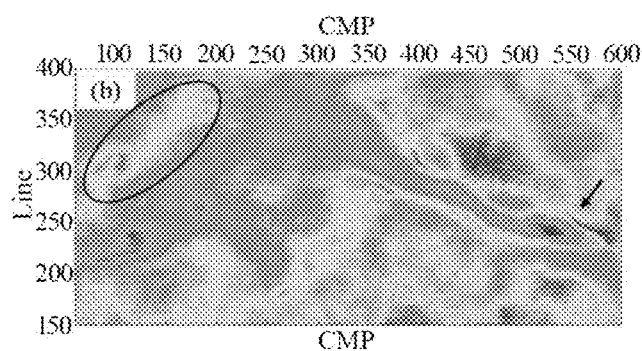
Figure 5C:
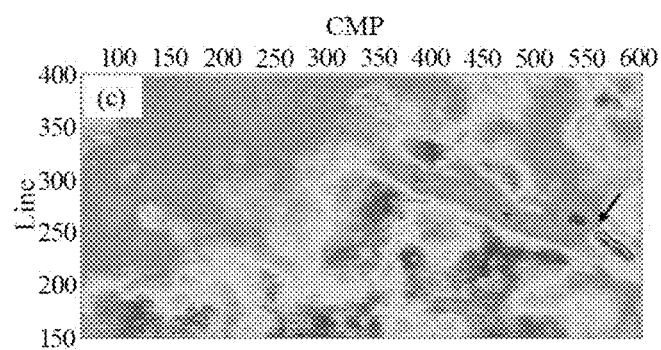
Figure 5D:
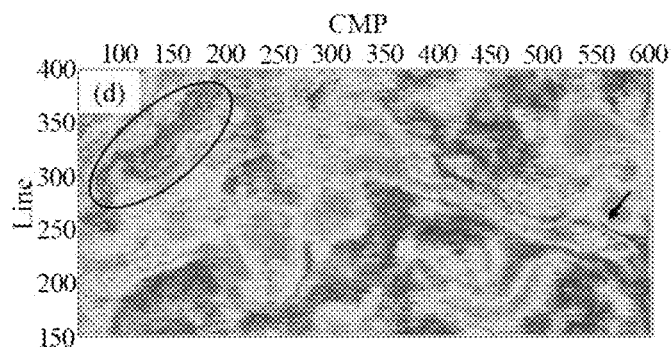

Single-frequency horizontal slices of 5 Hz and 80 Hz are performed on the cross sections before and after stripping the strong reflection layer, respectively. The single-frequency horizontal slices of 5 Hz and 80 Hz before stripping the strong reflection layer show that the two single-frequency slices have little difference in their structures due to the presence of the strong reflection layer (FIGS. 5A-5B). Whereas the single-frequency horizontal slices of 5 Hz and 80 Hz after stripping the strong reflection layer show that the two single-frequency horizontal slices have apparent difference in their structures. The low-frequency horizontal slice of 5 Hz shows rich low-frequency information of the geological structure, and mainly describes a rough outline of the geological structure (FIG. 5C). The high-frequency horizontal slice of 80 Hz mainly reflects detailed features of the geological structure (FIG. 5D).

The above-mentioned are illustrative of the technical solutions of this disclosure, and not intended to limit the present disclosure. Modifications based on the spirit of this disclosure should fall within the scope of the present disclosure defined by the appended claims.

What is claimed is:

1. A method of stripping a strong reflection layer based on deep learning, comprising:
   (1) making a training sample for seismic wavelet prediction;
   (2) training a mapping relationship between a seismic wavelet and a seismic record based on an alternate iterative deep neural network;
   (3) predicting a seismic wavelet w based on the mapping relationship between the seismic wavelet and the seismic record trained in step (2);
   (4) selecting seismic data below or above a strong reflection interface in a target work area, wherein the seismic data does not contain the strong reflection interface; and normalizing the seismic data trace by trace as a training sample of a weak reflection record $S_n$ for stripping the strong reflection layer;
   (5) counting a range K1-K2 of a ratio of a peak amplitude of the strong reflection layer in the target work area to a peak amplitude of a reflected wave except the strong reflection layer;
   (6) based on the seismic wavelet predicted in step 3, building a strong refection record $S_s$ only containing the strong reflection layer using a convolution algorithm; wherein a range of a reflection coefficient used in the convolution algorithm is set to the range K1-K2 obtained in step (5); and a position of a reflection interface changes randomly;
   (7) randomly choosing the strong reflection record $S_s$ and the weak reflection record $S_n$ followed by adding to obtain a seismic record $S_r$ containing strong reflection and weak reflection simultaneously;
   (8) weighting the $S_r$, $S_s$, and $S_n$ with the strong reflection layer as a center using Gaussian window $G_w$ followed by normalization to obtain $GS_r$, $GS_s$ and $GS_n$;
   (9) training a mapping relationship between the $GS_r$ and the $GS_s$ based on U-Net;
   (10) selecting seismic record $S_o$ containing the strong reflection layer in the target work area; recording a maximum value $M_s$ of each trace $S_{oi}$; and taking a position $t_p$ of the maximum value $M_s$ of each trace as a position of the strong reflection layer;
   (11) weighting the seismic record $S_o$ with the position $t_p$ as a center using the Gaussian window $G_w$ to obtain a weighted seismic record; and normalizing seismic data of each trace by dividing by the maximum value $M_s$ to obtain seismic data of each trace $GS_{oi}$;
   (12) predicting a strong reflection layer $GD_{si}$ of the seismic data of each trace $GS_{oi}$ based on the mapping relationship obtained in step (9);
   (13) subjecting the $GD_{si}$ to amplitude recovery according to a formula shown as follows:

$$D_{si}(t) = \begin{cases} 0 & G_w(t) \le 0.1 \\ GD_{si}(t) * M_{si}/G_w(t) & G_w(t) \ge 0.1 \end{cases} \quad (1)$$

wherein a subscript i is a trace number; and $D_{si}$ is a strong reflection layer after the amplitude recovery;

(14) obtaining seismic data $D_{ni}$ after the strong reflection layer is stripped using a formula shown as follows:

$$D_{ni}(t) = S_{oi}(t) - D_{si}(t) \quad (2); \text{ and}$$

(15) detecting, in the target work area, a weak reflection signal of an oil and gas reservoir with the seismic data $D_{ni}$ after the strong reflection layer is stripped, and performing reservoir prediction and oil-gas exploration in the target work area based on the detection.

2. The method of claim 1, wherein the Gaussian window $G_w$ used in step (8) is expressed as follows:

$$G_w(t) = e^{-\alpha(t-t_0)^2}. \quad (3)$$

3. The method of claim 1, wherein an optimization function used in step (9) is shown as follows:

$$\min_{C_\Theta^\dagger} E_{learn} = \quad (4)$$

$$\min_{C_\Theta^\dagger} E \left[ \left| GS_{si}(t) - C_\Theta^\dagger GS_{ri}(t) \right| + \left| GS_{ri}(t) - C_\Theta^\dagger GS_{ri}(t) - GS_{ni}(t) \right| \right];$$

wherein a subscript i is a trace number; $GS_{si}$ is a seismic record only containing strong reflection in the training sample; $GS_{ri}$ is a seismic record containing the strong reflection; $C_\Theta^\dagger$ is a mapping function determined by a parameter set $\Theta$, and represents a mapping relationship between the seismic record containing the strong reflection and the seismic record only containing the strong reflection; and $GS_{ni}$ is a seismic record without the strong reflection.

* * * * *